Sept. 7, 1954 N. OSKERKA, JR., ET AL 2,688,737

HERMETICALLY SEALED CONNECTOR

Filed Jan. 13, 1950

Inventors:
Curt W. Klostermann
Nick Oskerka Jr.
By: L. F. Hammond
Attorney

Patented Sept. 7, 1954 2,688,737

UNITED STATES PATENT OFFICE 2,688,737

HERMETICALLY SEALED CONNECTOR

Nick Oskerka, Jr., Cicero, and Curt W. Klostermann, Chicago, Ill., assignors to American Phenolic Corporation, Chicago, Ill., a corporation of Illinois Application January 13, 1950, Serial No. 138,482

4 Claims. (Cl. 339—136)

Figure 1:
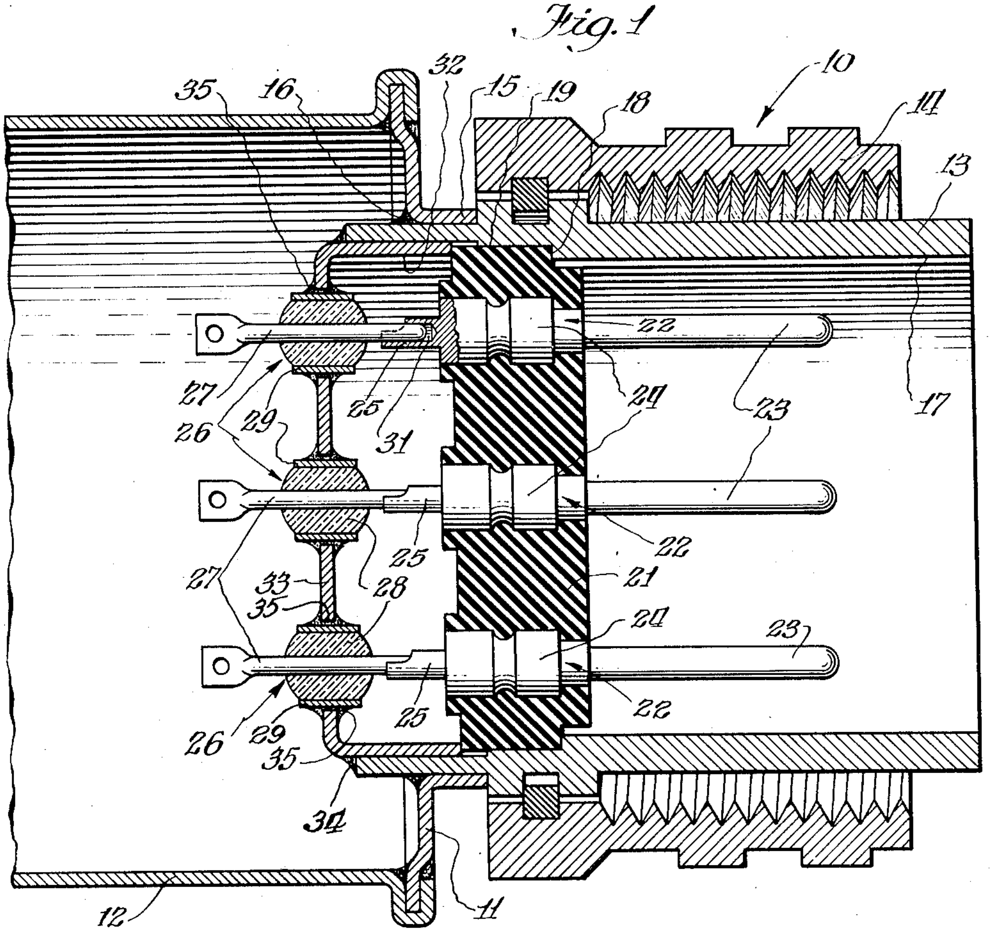

The present invention relates to electrical connectors and has particular reference to "cable connectors" which, while they may employ only one or two conductors, ordinarily contemplate a cable having several or many individual conductors. These cable connectors ordinarily have mating plug and receptacle components whereby all of the individual conductors forming the cable may be simultaneously joined or disconnected. Such connectors are well known in the art, and are almost universally employed to establish connections between related operating units in equipment such as radar apparatus, military communication installations, or automatic control devices of the types commonly utilized in modern aircraft. To this end, it is common practice to mount the receptacle component of one or more connectors in fixed position on a cabinet, panel or chassis housing a unit of the equipment, and to provide flexible cables with matching plugs that may be inserted in or withdrawn from the receptacles at will.

At the present state of the art, it has become an accepted fact that certain types of electrical and electronic equipment should be hermetically sealed to exclude air from the vital parts of the circuit and, consequently, to prevent condensation of moisture or formation of fungus growths which would otherwise soon render proper operation impossible. This is particularly necessary in the case of electronic apparatus of a military nature, or in the radar or control circuits of aircraft intended for operation in areas of extremely adverse climatic conditions, since in such cases the equipment is not only subjected to extremes of humidity, but is exposed to wide variations of atmospheric pressure. In view of the above, it is the practice to house the vital parts of equipment of this kind in a sealed chassis, and since the equipment should withstand violent physical shocks as well as long continued vibration, it is customary to provide a sheet metal housing around the apparatus, with the joints soldered throughout to form a perfectly airtight barrier against air and moisture.

Notwithstanding the above, it is necessary to provide exterior circuits associated with the sealed units. It follows that electrical connections with the sealed-in equipment must be established through the sealed metal wall of the unit housings. Moreover, to be entirely satisfactory for the purpose, these connections must reconcile several conflicting requirements. First, they must be of unusually high electrical efficiency, having extremely low inherent resistance and thus able to pass the feeble currents characteristic of sensitive communication equipment without any significant voltage drop. They must be unusually well insulated, and must be of low loss electrical design and thus suited to use at extremely high radio frequencies. They should be as light, simple and compact as possible, since a single connector may include dozens of individual contacts, and in equipment of this type both weight and space are at a premium. With all of the above, however, the connectors must be rugged and mechanically strong, so that they are not only capable of withstanding long continued vibration, but are able to resist violent physical shocks and extreme impacts. These requirements are necessarily conflicting, and are rendered more so by manufacturing considerations, which require that a reasonable range of dimensional tolerances be permitted, and preclude the use of any connector so designed that it presents serious manufacturing or assembly difficulties, or so that ordinary dimensional variations will interfere with proper functioning.

It is, therefore, the general aim of the present invention to provide a cable connector adapted to establish a plurality of electrical connections through a sealed wall, wherein the conflicting requirements briefly outlined above are reconciled, to the end that an electrically efficient connector may be provided wherein the connections extending through the seal are of low loss design, the connector is simple, compact and easily assembled, a satisfactory hermetic seal is maintained, and the individual contacts are properly supported and insulated, yet so that the connector is not subject to damage by accidental impact nor by the abnormal forces exerted in coupling and uncoupling mating socket components having oversize, undersize or improperly spaced contacts.

To this end, it is an object of the present invention to provide a connector of novel structure having a rigid insulating body in which the several connector contacts are supported, with a metal sealing partition spaced from the body and provided with insulated terminal conductors comprising metallic pins with glass beads fused to the pins and sealed in the partition to establish electrical connection with the contact, whereby strains imposed on the contacts are not transmitted to the sealed terminal conductors, but are absorbed by the insulating body of the connector. A further object of the invention is the provision of a novel method of assembly of the parts, which avoids imposing initial strains on the seal of the terminal conductors as a result of dimensional variations in the parts.

Another object of the invention is the provision of a receptacle having a solid insulating body carrying the contacts, a metal sealing partition, and a terminal pin fixed to each contact in free standing relation therewith and extending through an oversize aperture in the sealing partition, with a fused seal uniting the sealing partition and the terminal pin and closing said aperture.

A further object of the invention is the provision of a hermetically sealed connector comprising a sealing wall and an insulating contacting mounting body spaced apart from each other, with a plurality of contacts carried by the insulating contact member, and a plurality of insulated terminal conductors extending through the sealing wall in generally corresponding positions therewith, together with a laterally yieldable electrical connector between each terminal conductor and its corresponding contact.

Figure 2:
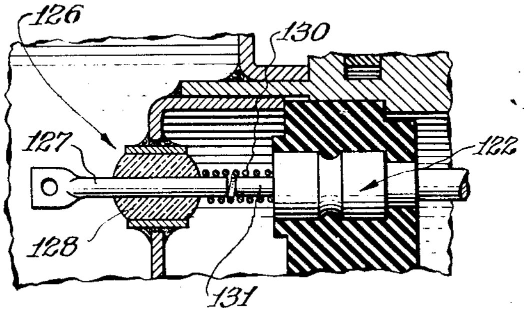

The present preferred embodiments of the invention are illustrated in the drawings of this specification, wherein:

Figure 1 is an anlarged central sectional view of a connector receptacle constructed in accordance with these teachings; and Figure 2 is a fragmentary detail sectional view of a modified form of the invention.

Cable connectors of the general type with which the present invention is concerned ordinarily comprise two mating components, one of which is in the form of a plug to which a flexible cable is attached, and the other being in the form of a socket or receptacle which is often mounted in fixed position on a panel, housing or chassis in which electrical equipment is housed. Such an arrangement is illustrated in Figure 1 of the drawings of this specification, wherein a receptacle generally designated by the numeral 10 is mounted on a metal wall 11, which represents a portion of the exterior wall of a hermetically sealed housing 12. The receptacle fitting includes a hollow metallic shell 13, which is of generally cylindrical shape, and has a screw threaded coupling ring 14 rotatably secured thereon so that a mating plug fitting can be securely attached.

As illustrated, the receptacle is mounted in a flanged aperture 15 provided in the housing wall 11, and the parts are secured together by an annular soldered joint 16, so that the socket shell and the wall 11 are hermetically sealed with respect to each other. The inside of the shell 13 includes a cylindrical bore 17 at the outer end, with an annular shoulder 18 positioned at an intermediate point along the length of the shell and separating the outer cylindrical portion 17 from an inner cylindrical portion 19. The shell is provided with an insulating insert or body portion 21, which is preferably formed of molded dielectric material shaped to fit tightly within the cylindrical portion 19 of the shell and to abut the flange 18 therein. The insert 21 carries one or more metallic contacts 22, which, in the form of the invention illustrated, comprise male contact pins 23 provided with enlarged mounting portions 24 molded into the insert 21. The mounting portions 24 may be grooved or knurled if desired, to insure a firm union between the dielectric material of the insert and the metal of the contacts, and the contacts carry sleeve portions 25 from which terminal conductors generally designated as 26 extend into the housing 12. The terminal conductors 26 each consist of a slender metallic pin 27 to which a glass insulating bead 28 is bonded, with a metal sleeve 29 surrounding the bead and bonded to it. The forward ends of the pins 27 are received in the bores 31 of the contact sleeves 25 and may be brazed, soldered or frictionally fitted therein.

The dielectric insert 21 in which the contacts 22 are carried is preferably molded to size and pressed into position in the socket shell, so that the contacts are held rigidly by the insert. The insert is held in position by an inwardly extending flange 32 formed integrally with the back plate 33 and soldered to the inner end of the shell at 34 to seal the back of the socket shell and secure the insert 21 in its position within the shell. The sleeves 29 of the terminal conductors 26 are soldered to the back plate 33 to complete the seal.

It has been previously stated that it is one of the objects of the present invention to provide a connector having its contacts supported in a rigid insulating body, together with a metal sealing partition and a terminal conductor including a bonded glass bead insulator sealed in the partition to establish an electrical connection extending therethrough, yet wherein the parts are so designed that the physical strains imposed on the contact pins (as in coupling or uncoupling the plug and receptacle of the connector) are not transmitted to the glass bead. The manner in which this is accomplished may be seen by viewing the illustration of Figure 1, wherein it will be apparent that while the pin 27 of the terminal conductor 26 is in intimate electrical contact with the sleeve 25 of the contact 22, yet thrusts and lateral strains imposed on the pin 23 of the contact are not transmitted to the glass bead 28 but are entirely absorbed in the rigid dielectric insert 21, so that there is little danger of fracturing the bead 28 and thus destroying the seal of the apparatus. By this arrangement the glass seals are relieved of all strains which might result from external forces acting on the contact pins and the socket shell.

It is also essential, however, to provide means whereby the several parts of the connector may be assembled without imposing initial stresses on the relatively fragile glass seal. Such stresses are set up in any conventional assembly operation, since all manufactured parts have dimensional variations, which necessarily impose strains on the parts whenever imperfectly fitted parts are fitted to each other. Ordinarily, the degree of stress imposed on the parts is dependent on the degree of dimensional variation existing between the parts and is unnoticed unless it is so great as to break some part or prevent assembly. In the present instance, however, the importance of maintaining a perfect hermetic seal over a long period of time is important enough to dictate taking all steps possible to avoid unnoticed initial stresses which may not cause immediate damage, but which may nevertheless result in a rupture of one of the glass beads after the unit has been subjected to a period of long sustained vibration, or may be an additional factor contributing to damage resulting from a violent physical impact on the equipment.

The possibility of initial stresses on the relatively fragile seals is overcome according to the present teaching by providing oversize openings 35 in the metal partition 33 and assembling the terminal conductors 26 in free standing relationship on the contacts 22 prior to sealing them in the partition wall. To assemble the unit in this manner, the insert 21, which carries the molded-in contacts 22, is first pressed into position in the socket shell, with the individual terminal conductor units (which comprise the pins 27, beads 32 and sleeves 29) inserted into the bores 31 of the several contacts. The forward portions of the conductors 26 may be brazed, soldered or friction fitted into the sleeves 25 as desired, it being necessary to establish only an intimate electrical contact between these parts, with enough physical rigidity to support the weight of the beads. The back wall or sealing partition 33 of the connector is then placed in position and soldered at 34, so that the individual beads 28 and sleeves 29 project through corresponding apertures 35 in the partition. The apertures 35 are sufficiently oversize, however, that their walls do not bear against the sleeves 29, and as a result, each of the terminal conductor units stands free, and in a position of zero stress, both as to its contact sleeve 25 and the back wall 33 of the socket. The unit is then sealed by flowing molten solder around the sleeves 29, so that the solder forms a hermetic seal and at the same time provides a rigid mechanical support securing each sleeve in its exact position of rest.

When the parts are assembled in this manner, it will be clear that the terminal conductor pins 27 are free from any initial strains, and are at the same time so mounted that strains imposed on the pins 23 of the contacts 22 are absorbed by the dielectric insert or body 21, rather than being transmitted to the glass seals. By this means a connector is provided which has physical strength on the one hand, yet has a high degree of electrical efficiency and maintains a low loss connection through an absolutely airtight housing wall.

The form of the invention illustrated in Figure 2 differs from the form described above only in that the terminal conductors 126 are not inserted directly in a bore of the contacts 122, but are joined thereto by a flexible connector adapted to permit some lateral movement between these parts without damaging the fragile glass bead 128. To this end, the rear portions of the contacts 122 are provided with small pilot portions 131 instead of the sleeves 25. These pilot portions are of diameter corresponding to the diameter of the conductor pin 127. A coiled metal spring 130 has its opposite ends telescoped over the pilot and the conductor pin, so that electrical conductivity is established between these parts. The spring 130 may be of any desired degree of stiffness so that it is capable of supporting the glass bead 128 to permit the parts to be assembled in the manner previously described, but the spring nevertheless has sufficient resiliency so that it prevents transmission of any appreciable strains from the contacts to the glass bead, even if the equipment if subjected to such violent impacts that the socket shell, housing wall or other parts be sprung out of their normal alignment. It will therefore be seen that by following the teachings of the present invention, the conflicting requirements of electrical efficiency and mechanical structure have been reconciled in highly satisfactory manner, since by these teachings it is entirely feasible to provide a cable connector which is small and compact in size, light in weight, and sufficiently rugged to withstand long use and considerable abuse, yet wherein the contacts are established in an efficient manner and a permanent, shock-proof hermetic seal provided.

Having thus described our invention, what we claim as new and desired to protect by United States Letters Patent is:

1. The method of assembling a hermetically sealed connector having a plurality of contacts supported in a contact mounting comprising a relatively fixed insulating connector body, a plurality of terminal conductors, consisting of a slender metallic pin to which a glass insulating bead is bonded, with a metal sleeve surrounding the bead and bonded to it, and an apertured sealing partition, comprising the steps of mounting a terminal conductor in self-supporting, free standing position on each of said contacts, passing the terminal conductors partially through the apertures in said sealing partition, and thereafter sealing the partition to the insulating connector body and soldering the metal sleeve of the terminal conductors in the apertures of said partition.

2. An electrical connector comprising, in combination, a contact mounting comprising a relatively fixed insulating connector body, at least one metallic contact carried in fixed position on said body, and a sealing cap comprising a metallic cup having a bottom thereon forming a partition adjacent said body, with an oversize aperture in said partition in coaxial alignment with said metallic contact; a terminal conductor consisting of a relatively rigid metallic pin having a glass bead bonded thereon at a point intermediate its ends, and an exterior metal sleeve bonded on said glass bead; said terminal conductor having one end of its metallic pin affixed in coaxial relationship with the contact and supported thereby in self-supporting, free standing, zero-stress, projecting position; with said conductor extending through the aperture in the partition, but with the sleeve portion of said conductor passing through the oversize aperture thereof in spaced relationship therewith and defining a generally annular gap between said sleeve and said aperture; with solder sealing the gap between the oversize aperture and said sleeve and effecting a hermetic seal of said aperture.

3. An electrical connector comprising, in combination, a contact mounting comprising a relatively fixed insulating connector body, at least one metallic contact carried in fixed position on said body, an a tubular sleeve extending from said contact; a sealing cap having a metallic partition adjacent said body, with an oversize aperture in said partition in coaxial alignment with the sleeve of said metallic contact; a terminal conductor comprising a relatively rigid metallic pin having a glass bead bonded thereon at a point intermediate its ends, and an exterior metal sleeve bonded on said glass bead; said terminal conductor having one end of its metallic pin affixed in coaxial telescoping relationship with the tubular sleeve of said contact and supported thereby in relatively rigid free standing, zero-stress, projecting position; with said conductor extending through the aperture in the partition, but with the sleeve portion of said conductor passing through the oversize aperture thereof in spaced relationship therewith and defining a generally annular gap between said sleeve and said aperture; with solder sealing the gap between the oversize aperture and said sleeve and effecting a hermetic seal of said aperture.

4. The method of assembling a hermetically sealed connector having a contact mounting comprising a relatively fixed insulating connector body and at least one contact supported in said insulating body, at least one terminal conductor consisting of a slender metallic pin to which a glass insulating bead is bonded, with a metal sleeve surrounding the bead and bonded to it, and a sealing cap comprising a metallic cup having a bottom portion comprising a partition having at least one aperture therethrough, comprising the steps of mounting said terminal conductor in self-supporting, free standing position projecting from and supported wholly by said contact, placing the sealing cap on the connector body and simultaneously inserting said terminal conductor into the cap and passing it outwardly through said aperture in said sealing partition from the inside of the cup while maintaining said cup and contact in spaced apart relation, securing said sealing cap in fixed position with respect to said insulating body, and thereafter soldering the metal sleeve of said terminal conductor within the aperture in the bottom of said cup.

References Cited in the file of this patent

UNITED STATES PATENTS

| Number | Name | Date |
|---|---|---|
| 584,750 | Scribner | June 15, 1897 |
| 2,078,776 | Ruggles | Apr. 27, 1937 |
| 2,137,424 | Thomas | Nov. 22, 1938 |
| 2,147,418 | Bahls | Feb. 14, 1939 |
| 2,419,018 | Gudie | Apr. 15, 1947 |
| 2,440,279 | Larkins, Jr. | Apr. 27, 1948 |
| 2,451,800 | Buchanan et al. | Oct. 19, 1948 |
| 2,503,429 | Ziegler | Apr. 11, 1950 |